May 31, 1966

J. B. HUDSON 3,254,222

FERROMAGNETIC CRYSTAL WHISKER
FREQUENCY RESPONSIVE DEVICE

Filed April 1, 1963

INVENTOR.
JOHN B. HUDSON

BY
*Samuel R. Genca*

3,254,222
FERROMAGNETIC CRYSTAL WHISKER FREQUENCY RESPONSIVE DEVICE
John B. Hudson, Fairport, N.Y., assignor to General Dynamics Corporation, a corporation of Delaware
Filed Apr. 1, 1963, Ser. No. 269,261
11 Claims. (Cl. 250—83.3)

The present invention relates in general to radiometry and more particularly to a novel radiometer.

Although the present invention is suitable for more general applications, it is particularly adapted for infrared systems. In such systems, there is a pressing need for a sensitive, low noise, fast responsive radiometer or detector which converts infrared energy to an electrical signal.

In the past, attempts have been made to produce a radiometer or detector which would have high sensitivity across the entire infrared spectrum with low noise and fast response time. Known prior art detectors for use in infrared systems consist of thermal bolometers and photoconductors. The thermal bolometer may include a tiny thermistor made of a material, a few microns in thickness, whose resistance varies sharply in a known manner with temperature. Wires are connected to the thermistor for conducting a biasing current. Infrared energy striking the thermistor is converted into heat which changes the electrical resistance of the thermistor. The thermal bolometer generates an output signal by varying the level of the bias current flowing through the thermistor in response to changes in the resistance of the thermistor resulting from infrared heating. The thermistor may be included in a bridge circuit.

The prior art photoconductor detector may include a tiny semiconductor formed of a material that absorbs photon energy from infrared radiation. In response to the absorption of photon energy, the resistance or conductivity of the semiconductor material changes markedly. Some examples of semiconductor materials used in photoconductors are lead sulphide, lead selenide, and indium antimonide.

Although thermal bolometers and photoconductor detectors have served satisfactorily within their limited capabilities, they do have disadvantages which limit their use and the capability of the infrared systems employing these bolometers and photoconductor detectors. For example, thermal bolometers have nearly ideal wideband responsivity, but their sensitivity and frequency response are considerably low. The sensitivity and frequency response of thermal bolometers are a function of the size and thickness of the thermistor. Reducing the thickness of the thermistor decreases the response time. Bolometer thermistors have been reduced to a point where they are about ten microns or less in thickness by such techniques of plating or shaving. Further performance gains of the thermal bolometer will be difficult to achieve since further reduction in thickness of the thermistor appears to be impractical especially since conductors or lead wires must be bonded or connected to the thermistor.

Although photoconductor detectors are more sensitive than thermal bolometers, their response falls off sharply at the longer wavelengths of infrared energy. Thus, photoconductor detectors are used chiefly for higher temperature objects. The sensitivity and responsivity of the photoconductor may be increased by cooling to a temperature approaching the temperature of liquid oxygen or nitrogen. This can be accomplished, but at the expense of added complexity and refrigeration.

A further disadvantage of prior art thermal bolometers and photoconductor detectors resides in the fact that these detectors operate in a "wet" system; that is, there is a constant biasing current flowing through the thermistor or photoconductor which may cause electrical noise. Detector noise in a bolometer is a function of the maximum bias current that can be applied without excessive heating of the bolometer's thermistor.

Accordingly, it is a general object of the present invention to provide a novel radiometer.

It is another object of the present invention to provide a radiometer which is frequency responsive rather than resistance responsive.

It is still another object of the present invention to provide a radiometer in which the radiation sensing element is formed of a crystal whisker having a natural resonant frequency of vibration which varies in response to the quantity of radiant energy absorbed by the crystal whisker.

It is a further object of the present invention to provide a novel radiometer which has high sensitivity, rapid responsivity, and one which can be easily manufactured without the necessity of bonding or soldering conductors to the radiation sensing element.

The above and other objects of the present invention are accomplished by a novel radiometer which functions as a frequency device rather than as a resistance device. The radiometer comprises an evacuated glass envelope formed of a material transmissive of radiant energy and a longitudinal ferromagnetic crystal whisker mounted in the envelope for vibrations therein. The crystal whisker has substantially no internal losses and has a natural resonant frequency of vibration which varies in response to radiation incident on and absorbed by the crystal whisker. Further included are excitation means for exciting the crystal whisker into vibrations and means for translating the vibrations of the crystal whisker into an electrical output signal having a frequency value which is a function of the resonant frequency of vibration of the crystal whisker. A mask having an opening of a given area in registry with the crystal whisker may be provided to define the area from which radiation is received.

The construction of the radiation sensing element, the crystal whisker, of the radiometer is different from the usual technique of the prior art. The crystal whisker as grown by such processes as reducing ferrous bromide in a hydrogen atmosphere maintained at a temperature of 700° C. has a low physical mass and is substantially hysteresis-free elastically. The low physical mass and the high strength of the crystal whisker enables the radiometer to be non-fragile and resistant to shock and vibration. The crystal whisker further has a low thermal mass which permits a rapid thermal response and high sensitivity to infrared radiation. These features are further enhanced by the fact that the crystal whisker does not conduct current, thus eliminating the problems of electrical heating and noise.

The above mentioned and other features and objects of this invention and the manner of attaining them will become more apparent and the invention itself will be best understood by reference to the following description of an embodiment of the invention taken in conjunction with the accompanying drawing wherein.

Figure 1:
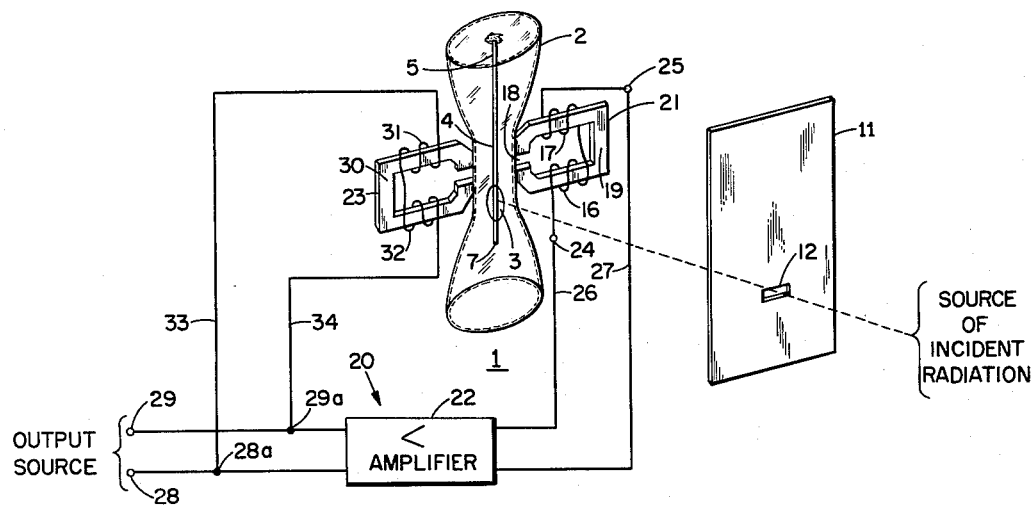
FIG. 1 is a perspective view of a radiometer embodying the invention.

Referring now to FIG. 1, there is shown at 1 a preferred embodiment of the invention. At 1 there is shown a frequency responsive radiometer in alignment with a source of incident radiation 10. The radiometer 1 comprises an evacuated glass envelope 2 containing a window 3 of a material having good transmissivity of the radiation to be detected and a longitudinal crystal whisker 4 mounted inside the envelope and having a portion thereof in registery with the window 3 and the source of incident radiation 10. The radiometer further includes an opaque mask 11 interposed between the source of radiation 10 and the glass envelope 2 for shielding the crystal whisker 4. The radiometer also includes an electrical pickup system 20 positioned in cooperative relationship with the crystal whisker 4 for generating an electrical output signal in response to the vibrations of the crystal whisker 4.

The glass envelope 2 is evacuated of all gases so as to offer no impedance to vibrations of the crystal whisker 4. The window 3 in the glass envelope 2 may be silver chloride or sapphire which transmits with little attenuation the visible portion of the spectrum as well as the infrared. The window 3 may be eliminated if the glass envelope is made of a material having good transmissivity of the radiation to be detected. The window 3 is a filter which will pass only those wavelengths of radiant energy to be detected.

The crystal whisker 4 may be formed of any ferromagnetic material such as iron, having a relatively high modulus of elasticity and substantially no internal losses or elastic hysteresis. The iron crystal whisker 4 is now commercially available and may be grown, for example, by reducing ferrous bromide in a hydrogen atmosphere maintained at a temperature at approximately 700° C. Iron crystal whisker 4 may be used as grown since a crystal whisker may be grown to a thickness of one micron or more and having a length of at least one centimeter. The elastic and physical characteristics of the crystal whisker will be explained more in detail with FIGS. 2 and 3.

The iron crystal whisker 4 is fixed at 5 to the inside of the glass envelope 2 by an adhesive, such as 1,5 diphenylcarbohydrazide, and the other end 7 is free to vibrate in the glass envelope 2. The length, thickness, and stiffness of the crystal whisker 4 may be selected in accordance with conventional engineering practice to give a desired transverse resonant mode of vibration when fixed at one end 5.

Figure 3:
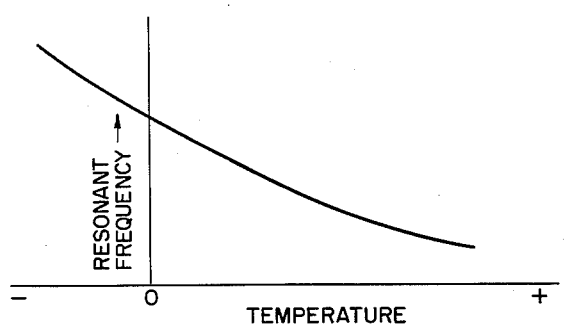
FIG. 3 is a graph used in explaining the operation of the invention.

The natural resonant frequency of vibration of the crystal whisker 4 varies markedly when radiant energy is absorbed by the crystal whisker 4 because of the temperature rise induced by the absorption of radiant energy. The resonant frequency of the crystsal whisker 4 increases or decreases in direct proportion to the amount of radiant energy absorbed by the crystal whisker 4. FIG. 3 is a performance curve of the crystal whisker to illustrate the change in the natural resonant frequency of the crystal whisker 4 with changes in temperature resulting from the absorption of radiant energy. The curve in FIG. 3 may be used to calibrate the radiometer 1.

The mask 11 includes an opening 12 having a given area in registry with the crystal whisker 4. The mask 11 shields the glass envelope 2 and all but a portion of the crystal whisker 4 for the source of incident radiation 10. The mask 11 is shown spaced from the glass envelope 2 for clarity sake to show the electrical pickup system 20. However, it should be understood that the mask 11 may be a film coating on the glass envelope 2. The opening 12 in the mask 11 may be made as small as one micron in width and a few microns in length transverse to the longitudinal axis of the crystal whisker 4. Thus, if the crystal whisker 4 has a width of one micron, an area of one square micron may be exposed for radiation. This is highly desirable for quantizing or monitoring a given area of radiation.

The electrical pickup system 20 includes a variable reluctance transducer 21 for deriving an electrical output signal in response to vibrations of the crystal whisker 4, an amplifier 22, and an electromagnet 23. The transducer 21 and electromagnet 23, as shown, are positioned on the outside of the envelope 2 on either side of the crystal whisker 4 proximal to the free end of the crystal whisker 4. The glass envelope 2 is narrowed down proximal to the transducer 21 and electromagnet 23, so that the crystal whisker 4 may be vibrated by the magnetic field about electromagnet 23 and the crystal whisker 4 may in turn vary the flux path in transducer 21. It may be desirable, in some cases, to vary the shape of the glass envelope 2 and include the transducer 21 and electromagnet 23 inside the glass envelope 2. The transducer 21 includes a magnetic structure 19 having an air gap at 18 and interconnected coils 16 and 17 which terminate at terminals 24 and 25, respectively. Lead wires 26 and 27 connect transducer 21 to amplifier 22. Amplifier 22 has output terminals 28 and 29 and junctions 28a and 29a, respectively. Electromagnet 23 may be similar in construction to the transducer 21. The electromagnet includes a magnetic structure 30 and interconnected coils 31 and 32 connected to junctions 28a and 29a by lead wires 33 and 34, respectively.

In the operation of the radiometer 1, the iron crystal whisker 4 is first set into vibrations at its natural resonant frequency by the electromagnet 23 which generates a corresponding varying magnetic field having the same frequnecy as the resonant frequency as the crystal whisker 4. The crystal whisker 4, when vibrated, varies the flux in the air gap 18 of transducer 21 which generates an output signal which is fed into amplifier 22 over leads 26 and 27. The output signal is amplified by amplifier 22 and is placed across output terminals 28 and 29. The output signal from the amplifier 22 is also fed into electromagnet 23 from junctions 28a and 29a which sustains the crystal whisker 4 in vibration at its natural resonant frequency. As the crystal whisker 4 absorbs radiant energy from the source 10, its natural resonant frequency changes markedly causing a frequency change in the output signal at output terminals 28 and 29 and at junctions 28a and 29a. The output signal for amplifier 22 is again fed back into electromagnet 23 which now sustains the crystal whisker 4 into vibrations in the new resonant frequency.

FIG. 3 shows that as the temperature of the crystal whisker increases, the natural resonant frequency of the crystal whisker decreases and, conversely, as the temperature of the crystal whisker 4 decreases its resonant frequency increases.

Figure 2:
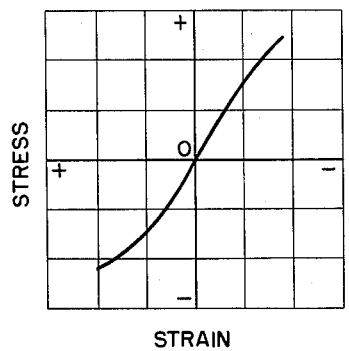
FIG. 2 is an elastic hysteresis curve showing the elastic property of a ferromagnetic crystsal whisker.

FIG. 2 is an elastic hysteresis curve of the crystal whisker 4 and illustrates that for each cycle there is substantially no energy loss due to internal friction of the crystal whisker. Iron crystal whiskers have substantially no elastic hysteresis such as is found in polycrystalline materials. The iron crystal whisker 4 is a high Q element; thus, it may be vibrated continuously without danger of internal heating due to internal friction. This, of course, makes it an excellent sensing element for a radiometer since heating of the crystal whisker is only a function of the radiant energy absorbed by the crystal whisker.

The radiometer 1 may be modified, without departing from the invention, by utilizing a single transducer 21 which will not only act as an electromagnetic pickup device but can be used as an electromagnet to sustain and excit the crystal whisker into vibrations by suitable switching means in a manner well known to those skilled in the art. This may be desired where the crystal whisker vibrates in a plane parallel to the incident radiant energy. Other modifications to the invention may include an adjustable mechanical mask system having a variable area opening which may be substituted for the mask 11.

While there has been shown and described a specific embodiment of the invention, other modifications will readily occur to those skilled in the art. It is not, therefore, desired that this invention be limited to the specific arrangement shown and described, and it is intended in the appended claims to cover all modifications within the spirit and scope of the invention.

What is claimed is:

1. A radiometer comprising an evacuated envelope formed of a material transmissive of radiant energy, a longitudinal ferromagnetic crystal whisker mounted in said envelope for vibrations therein, said crystal whisker having a natural resonant frequency of vibration which varies in response to exposure to radiant energy, and means positioned in cooperative relationship with said crystal whisker for vibrating and translating the vibrations of said crystal whisker into an electrical output signal having a frequency value which is a function of said resonant frequency of vibration of said crystal whisker.

2. The radiometer defined in claim 1 and a mask having an opening of a given area in registry with a portion of said crystal whisker for shielding said crystal whisker from said radiant energy.

3. The radiometer defined in claim 1 wherein said crystal whisker is a near-perfect iron crystal whisker.

4. The radiometer defined in claim 1 wherein said crystal whisker is fixed at one end thereof to said envelope and the other end free to vibrate.

5. The radiometer defined in claim 1 wherein said evacuated envelope is formed of a material transmissive of infrared radiation.

6. A radiometer comprising an evacuated envelope including a window formed of a material transmissive of radiant energy of a given wavelength, a longitudinal ferromagnetic crystal whisker mounted in said envelope for vibrations therein in register with said window, said crystal whisker having a natural resonant frequency of vibration which varies in response to exposure to radiant energy, and means for vibrating and translating the vibrations of said crystal whisker into an electrical output signal having a frequency value which is a function of said resonant frequency of vibrations of said crystal whisker.

7. A radiometer comprising an evacuated envelope formed of a material transmissive of radiant energy, a longitudinal ferromagnetic crystal whisker mounted in said envelope for vibrations therein, said crystal whisker having a natural resonant frequency of vibration which varies in response to exposure to radiant energy, excitation means coupled to said crystal whisker for exciting said crystal whisker into vibrations, and means positioned in cooperative relationship with said crystal whisker for translating the vibrations of said crystal whisker into an electrical output signal having a frequency value which is a function of said resonant frequency of vibration of said crystal whisker.

8. A radiometer comprising an evacuated envelope formed of a material transmissive of infrared energy, a longitudinal ferromagnetic crystal whisker mounted in said envelope for vibrations therein, excitation means coupled to said crystal whisker for exciting said crystal whisker into vibrations, said crystal whisker having a natural resonant frequency of vibration which varies in response to exposure of infrared energy, an opaque mass having an opening of a given cross-sectional area in registry with a portion of said crystal whisker for shielding all but said portion of said crystal whisker from said infrared energy, and pickup means positioned in cooperative relationship with said crystal whisker for translating the vibrations of said crystal whisker into an electrical output signal having a frequency value which is a function of said resonant frequency of vibration of said crystal whisker.

9. The radiometer defined in claim 8 wherein said excitation means coacts with said pickup means for sustaining said crystal whisker into vibrations.

10. A radiometer comprising a source of infrared energy, an evacuated envelope having a cavity therein, a window formed of a material transmissive of infrared energy communicating with said cavity mounted in sealing relationship with said envelope, a longitudinal ferromagnetic crystal whisker mounted in said cavity of said envelope for vibrations therein in registry with said window and said source of infrared energy, said crystal whisker having a natural resonant frequency of vibration which varies in response to exposure of said infrared energy, excitation means coupled to said crystal whisker for exciting said crystal whisker into vibrations, and means positioned in cooperative relationship with said crystal whisker for translating the vibrations of said crystal whisker into an electrical output signal having a frequency value which is a function of said resonant frequency of vibration of said crystal whisker.

11. A radiometer comprising a source of infrared energy, an evacuated envelope having a cavity therein, a window formed of a material transmissive of infrared energy communicating with said cavity mounted in sealing relationship with said envelope, a longitudinal ferromagnetic crystal whisker mounted in said cavity of said envelope for vibrations therein in registry with said window and said source of infrared energy, said crystal whisker having a natural resonant frequency of vibration which varies in response to exposure of said infrared energy, excitation means coupled to said crystal whisker for exciting said crystal whisker into vibrations, and means positioned in cooperative relationship with said crystal whisker for translating the vibrations of said crystal whisker into an electrical output signal having a frequency value which is a function of said resonant frequency of vibration of said crystal whisker.

References Cited by the Examiner

UNITED STATES PATENTS

| | | | |
|---|---|---|---|
| 2,811,649 | 10/1957 | Atkins | 250—83.1 |
| 2,862,416 | 12/1958 | Doyle | 307—88.5 |
| 2,957,081 | 10/1960 | Chapman | 250—83.3 |
| 3,024,429 | 3/1962 | Cavalieri | 331—156 |
| 3,107,530 | 10/1963 | Boss | 73—355 |

RALPH G. NILSON, *Primary Examiner.*

JAMES W. LAWRENCE, *Examiner.*